(12) United States Patent
Vaughan et al.

(10) Patent No.: US 11,719,647 B2
(45) Date of Patent: *Aug. 8, 2023

(54) METHODS AND SYSTEMS FOR MEASURING THE TEXTURE OF CARPET

(71) Applicant: COLUMBIA INSURANCE COMPANY, Omaha, NE (US)

(72) Inventors: William Neil Vaughan, Rydal, GA (US); David Lindahl, Euharlee, GA (US)

(73) Assignee: Columbia Insurance Company, Omaha, NE (US)

(*) Notice: Subject to any disclaimer, the term of this patent is extended or adjusted under 35 U.S.C. 154(b) by 0 days.

This patent is subject to a terminal disclaimer.

(21) Appl. No.: 17/590,426

(22) Filed: Feb. 1, 2022

(65) Prior Publication Data

US 2022/0155239 A1 May 19, 2022

Related U.S. Application Data

(63) Continuation of application No. 16/880,690, filed on May 21, 2020, now Pat. No. 11,262,317.

(60) Provisional application No. 62/850,898, filed on May 21, 2019.

(51) Int. Cl.
*G06K 9/00* (2022.01)
*G01N 21/892* (2006.01)
*G06T 7/90* (2017.01)
*G06T 7/529* (2017.01)

(52) U.S. Cl.
CPC ......... *G01N 21/8922* (2013.01); *G06T 7/529* (2017.01); *G06T 7/90* (2017.01); *G06T 2207/30124* (2013.01)

(58) Field of Classification Search
CPC .......... G01N 21/8983; G01N 21/8922; G01N 2021/8887; G06T 2207/30124; G06T 7/001; G06T 2207/10028
See application file for complete search history.

(56) References Cited

U.S. PATENT DOCUMENTS

| | | | |
|---|---|---|---|
| 2,922,519 A | 1/1960 | Radley | |
| 4,586,372 A * | 5/1986 | Massen | G01B 11/022 26/18.5 |
| 4,744,035 A * | 5/1988 | Hashim | D06H 3/16 209/939 |
| 5,774,177 A | 6/1998 | Lane | |

(Continued)

OTHER PUBLICATIONS

Carfagni et al., "A Real-Time Machine-Vision System for Monitoring the Textile Raising Process", University of Florence, Italy, Mar. 31, 2005.

(Continued)

*Primary Examiner* — Shervin K Nakhjavan
(74) *Attorney, Agent, or Firm* — Ballard Spahr LLP

(57) ABSTRACT

Methods and systems are disclosed for analyzing one or more images of a textile to determine a presence or absence of defects. In one example, an image of at least a portion of a textile may be obtained and compared to a reference image of a reference textile. Based on the comparison, one or more areas indicative of a height variation between the textile and the reference textile may be determined. An action may be performed based on the one or more areas indicative of the height variation.

20 Claims, 11 Drawing Sheets
(5 of 11 Drawing Sheet(s) Filed in Color)

(56) References Cited

U.S. PATENT DOCUMENTS

| | | | |
|---|---|---|---|
| 6,090,158 A * | 7/2000 | McLaughlin | D06B 11/0096 8/115.52 |
| 6,510,734 B1 * | 1/2003 | Feller | G01N 33/367 73/159 |
| 6,728,593 B2 * | 4/2004 | Hu | G06T 7/0004 356/613 |
| 6,950,717 B1 * | 9/2005 | Pierce | D06H 3/08 26/74 |
| 7,826,642 B2 * | 11/2010 | Cherkassky | G01N 21/8983 382/111 |
| 8,307,765 B2 * | 11/2012 | Orlandi | B32B 5/26 101/485 |
| 2002/0146153 A1 * | 10/2002 | Hu | G01N 21/8983 382/154 |
| 2003/0081215 A1 * | 5/2003 | Kumar | G01N 21/8983 356/431 |
| 2003/0229413 A1 | 12/2003 | Hu et al. | |
| 2004/0133297 A1 | 7/2004 | Vergote et al. | |
| 2005/0094853 A1 * | 5/2005 | Kang | G01N 21/8901 382/154 |
| 2007/0248246 A1 * | 10/2007 | Cherkassky | G06T 7/0002 382/111 |
| 2009/0283002 A1 * | 11/2009 | Schultze | B41F 33/0081 101/484 |
| 2011/0262028 A1 * | 10/2011 | Lipson | G06F 16/583 382/218 |
| 2011/0280449 A1 * | 11/2011 | Campbell, Jr. | B26F 1/3813 353/121 |
| 2015/0017376 A1 | 1/2015 | Smith et al. | |
| 2015/0221077 A1 * | 8/2015 | Kawabata | G06T 7/337 382/141 |
| 2015/0332451 A1 * | 11/2015 | Amzaleg | G06T 7/0002 382/149 |
| 2017/0029988 A1 | 2/2017 | Cohen | |
| 2018/0025485 A1 * | 1/2018 | Reunanen | G06V 10/751 382/141 |
| 2018/0268538 A1 * | 9/2018 | Reunanen | G06V 10/30 |
| 2020/0063310 A1 * | 2/2020 | Bell | D06P 5/15 |

OTHER PUBLICATIONS

International Search Report and Written Opinion issued by the International Searching Authority for PCT/US2020/034030 dated Aug. 12, 2020 (11 pages).

* cited by examiner

FIG. 9A
FIG. 9B
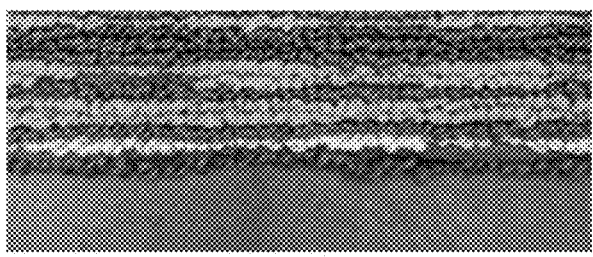
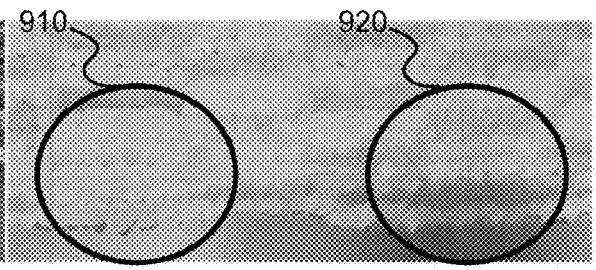

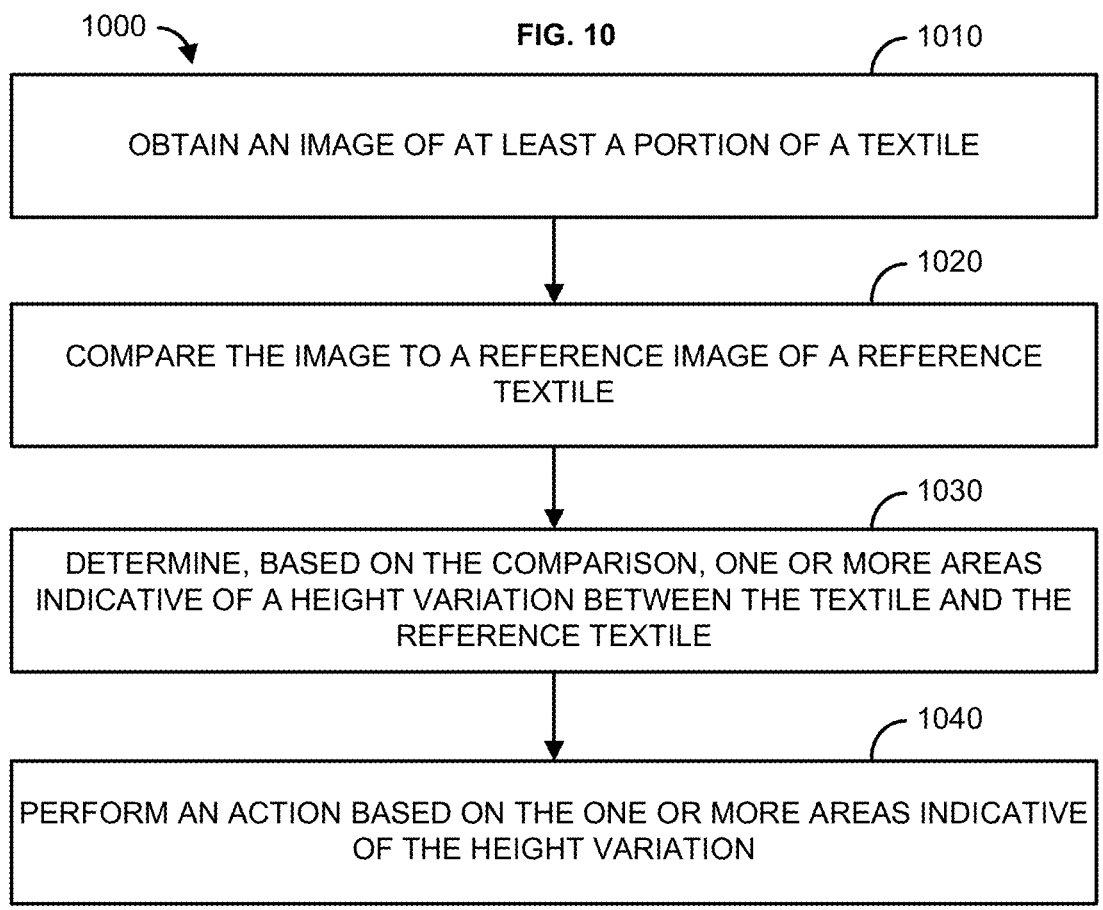

US 11,719,647 B2

METHODS AND SYSTEMS FOR MEASURING THE TEXTURE OF CARPET

CROSS-REFERENCE TO RELATED PATENT APPLICATION

This application is a continuation of U.S. application Ser. No. 16/880,690, filed on May 21, 2020, which claims priority to U.S. Application No. 62/850,898, filed on May 21, 2019, both of which are incorporated by reference in their entireties herein.

BACKGROUND

Human inspectors typically perform visual inspection for quality assurance in industrial products. The disadvantage with manual inspection are: (1) low speed, (2) high cost, (3) inability to perform real-time inspection and, (4) the limitations on the range of detectable defects. Currently, an inspector would compare a current piece of textile being inspected to a standard piece of textile and by viewing the pieces from different angles under certain lighted conditions to determine if the textures are the same. Multiple inspectors are involved in approving textiles across multiple shifts and multiple facilities.

Moreover, human visual perception is inherently subjective. Different inspectors frequently reach different conclusions with respect to identical samples. As a consequence, product consistency can be extremely difficult to obtain with manual inspection by different human inspectors. Existing computer vision technologies developed to address these concerns are not equipped to address the variety of potential defects that can occur in textile manufacturing.

SUMMARY

It is to be understood that both the following general description and the following detailed description are exemplary and explanatory only and are not restrictive.

Methods and systems are described comprising obtaining an image of at least a portion of a textile, comparing the image to a reference image of a reference textile, determining, based on the comparison, one or more areas indicative of a height variation between the textile and the reference textile, and performing an action based on the one or more areas indicative of the height variation.

Additional advantages will be set forth in part in the description which follows or may be learned by practice. The advantages will be realized and attained by means of the elements and combinations particularly pointed out in the appended claims.

BRIEF DESCRIPTION OF THE DRAWINGS

The accompanying drawings, which are incorporated in and constitute a part of this specification, illustrate embodiments and together with the description, serve to explain the principles of the methods and systems. The patent or application file contains at least one drawing executed in color. Copies of this patent or patent application publication with color drawing(s) will be provided by the Office upon request and payment of the necessary fee.

FIG. 9A is an example image of a portion of an object;
FIG. 9B is an example image of a portion of an object;
FIG. 10 is a flowchart illustrating an example method.

DETAILED DESCRIPTION

Figure 1:
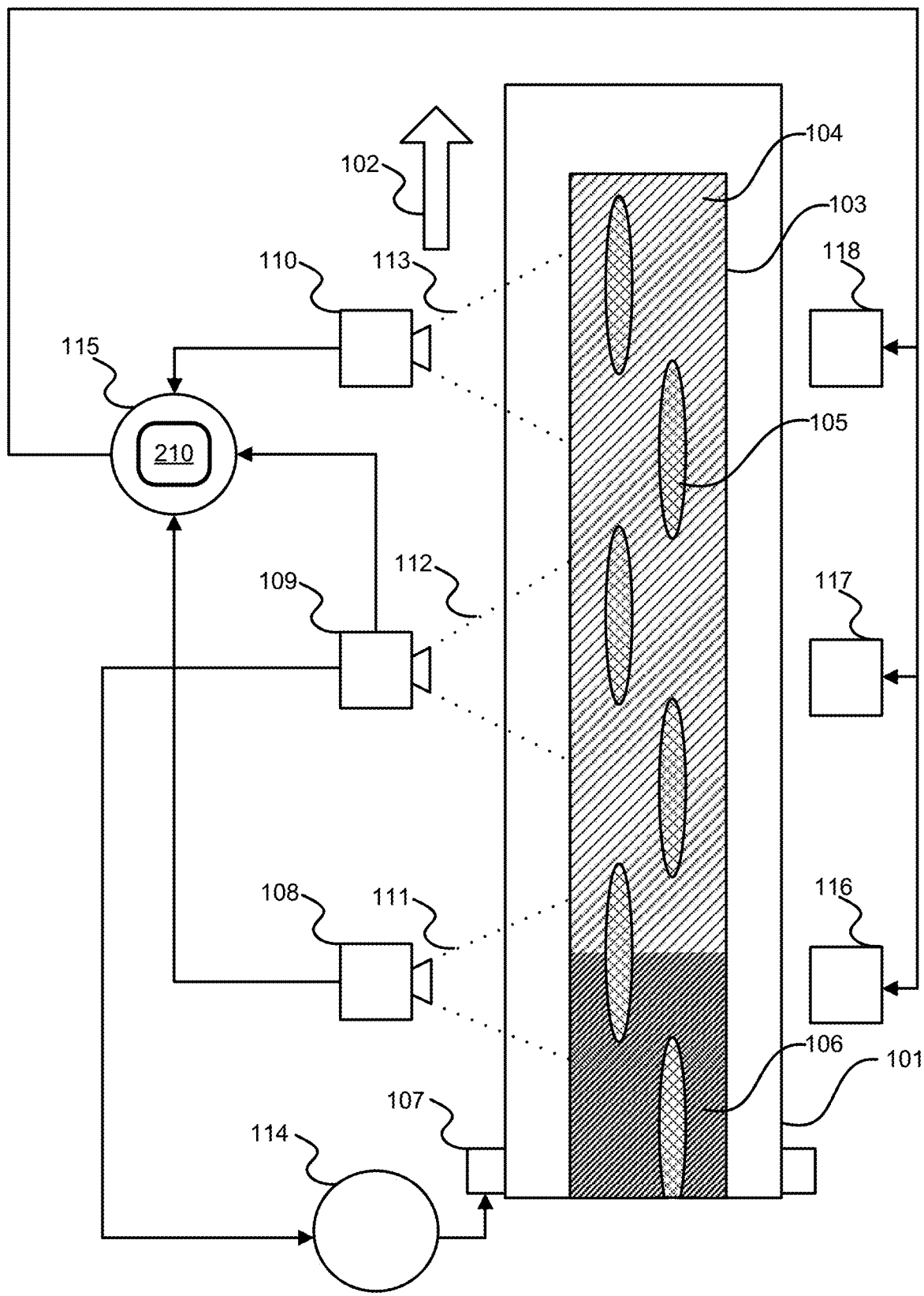
FIG. 1 is an example system.

Before the present methods and systems are disclosed and described, it is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an" and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the examples included therein and to the Figures and their previous and following description.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

FIG. 1 is a block diagram illustrating various aspects of an exemplary system 100 in which the present methods and systems can operate. One skilled in the art will appreciate that provided herein is a functional description and that the respective functions can be performed by software, hardware, or a combination of software and hardware.

In one aspect, the system 100 can comprise a conveyor belt 101. Only the conveyor belt 101 is shown for simplicity, other components of the system 100 not shown include one or more of, a carriage, a cam, a bed, and/or a guide adjustment. The conveyor belt 101 is shown traveling in direction 102.

One or more objects can be placed on the conveyor belt 101. In an aspect, the one or more objects can comprise a textile 103 (e.g. carpet, rug, fabric, etc. . . . ) in one or more states of assembly. The textile 103 may be a piece of carpet. For example, the textile 103 can comprise one or more layers. The one or more layers can comprise a backing, a padding, and/or pile. The backing can comprise a primary and/or a secondary backing. The primary backing provides the structure for tufts of textile. The secondary backing provides a bather from the padding and floor. The backing can be made from natural or synthetic materials. The padding can be a layer of cushion that is installed between the floor and the textile. Pile comprises yarn tufts. Pile can be cut or uncut. Cut pile refers to tufts whose loops are cut leaving straight tufts of textile. Loop pile refers to tufts whose loops are left uncut. Pile height refers to the height from the backing to the top surface of the pile. As shown in FIG. 1, the textile 103 comprises areas 104, 105, and 106 that have varying pile heights.

The conveyor belt 101 can pass over a drive roll which can be driven by a motor 107. The conveyor belt 101 may be adjustable up or down. The motor 107 enables positioning of the textile 103 relative to a camera 108, a camera 109, and a camera 110. The conveyor belt 101 can be advanced or reversed to cause respective portions of the textile 103 to be moved into a field of view 111, a field of view 112, and/or a field of view 113, associated with the camera 108, the camera 109, and the camera 110, respectively. The camera 108, the camera 109, and/or the camera 110 may be in fixed positions or may be adjustable. In another embodiment, the camera 108, the camera 109, and/or the camera 110 may be configured to move across a fixed textile 103.

A programmable logic controller (PLC) 114 (the PLC 114 can comprise a computing device, a PLC, or other controller/processor) can be configured to cause the motor 107 to advance in either direction to cause the any portion of the textile 103 to be moved into the field of view 111, the field of view 112, and/or the field of view 113.

In an aspect, the camera 108, the camera 109, and/or the camera 110 can be configured for scanning, decoding, reading, sensing, imaging, and/or capturing, one or more images of one or more portions of the textile 103. The camera 108, the camera 109, and/or the camera 110 can include one or more depth cameras for capturing, processing, sensing, observing, modeling, detecting, and interacting with three-dimensional environments. In certain aspects, the camera 108, the camera 109, and/or the camera 110 can recognize and detect depths and colors of objects in the field of view 111, the field of view 112, and/or the field of view 113, respectively. The camera 108, the camera 109, and/or the camera 110 can also provide other camera and video recorder functionalities, such as recording videos, streaming images or other data, storing data in image buffers, etc. These functionalities may or may not include depth information. In connection with hardware and/or software processes consistent with the disclosed embodiments, the camera 108, the camera 109, and/or the camera 110 can determine sizes, orientations, and visual properties of one or more portions of the textile 103. The camera 108, the camera 109, and/or the camera 110 can include or embody any camera known to one of ordinary skill in the art capable of handling the processes disclosed herein.

The camera 108, the camera 109, and/or the camera 110 can comprise line scan cameras. Line scan cameras contain a single row of pixels used to capture data very quickly. As an object passes the camera, a complete image can be reconstructed in software line by line.

The camera 108, the camera 109, and/or the camera 110 can comprise 3D cameras. The camera 108, the camera 109, and/or the camera 110 can comprise 3D line scan cameras. Unlike a conventional camera, a 3D camera also takes depth information and thus generates three-dimensional image data having spacing values or distance values for the individual pixels of the 3D image which is also called a distance image or a depth map. The additional distance dimension can be utilized to obtain more information regarding portions of the textile 103 detected by the camera 108, the camera 109, and/or the camera 110.

Two primary 3D camera technologies are currently available, structured light and time of flight. A structured light camera projects an active pattern and obtains depth by analyzing the deformation of the pattern. In contrast, a time-of-flight camera measures the time that light has been in flight to estimate distance. Either 3D camera may be implemented in the system 100.

The camera 108, the camera 109, and/or the camera 110 can include appropriate hardware and software components (e.g., circuitry, software instructions, etc.) for transmitting signals and information to and from a pass/fail controller 115 to conduct processes consistent with the disclosed embodiments. The pass/fail controller 115 can comprise a computing device, a PLC, or other controller/processor. The camera 108, the camera 109, and/or the camera 110 can transmit an image taken of a portion of the textile 103 to the pass/fail controller 115. The pass/fail controller 115 can comprise a decision engine 210. The decision engine 210 can be configured to analyze images received from the camera 108, the camera 109, and/or the camera 110 and determine a defect in one or more portions of the textile 103. Operation of the decision engine 210 is described in more detail with regard to FIG. 2A and FIG. 2B.

The camera 108, the camera 109, the camera 110, and/or the pass/fail controller 115 can output an image and/or one or more notifications to a monitor 116, a monitor 117, and/or a monitor 118, respectively. The pass/fail controller 115 can output a result of the determination made by the decision engine 210 to the monitor 116, the monitor 117, and/or the monitor 118.

In operation, the system 100 can be configured to determine a defect in one or more portions of the textile 103 and take one or more actions based on any determined defects. As the textile 103 is advanced by the conveyor belt 101, portions of textile 103, such as the areas 104, 105, and/or 106 will, at some point, pass into the field of view 111, the field of view 112, and/or the field of view 113 of the camera 108, the camera 109, and/or the camera 110, respectively. While FIG. 1 illustrates only three cameras, it is specifically contemplated that less than three or more than three cameras can be used. It is further contemplated that the conveyor belt 101 can be configured to have more than the illustrated three areas 104, 105, and 106, regardless of the number of cameras.

When a portion of the textile 103, such as the areas 104, 105, and 106, is within a field of view of one of the cameras, the camera can generate an image of the portion of the textile 103 within the field of view associated with that camera. For example, the camera 108 can generate an image of the area within the field of view 111, the camera 109 can generate an image of the area within the field of view 112, and the camera 110 can generate an image of the area within the field of view 113. Each of the camera 108, the camera 109, and/or the camera 110 can analyze their respective images or transmit their respective images to the pass/fail controller 115 for analysis. An entire image may be analyzed or one or more specific regions of an image may be analyzed.

In an embodiment, each of the camera 108, the camera 109, and/or the camera 110 can be configured to make an independent assessment of a portion of the textile 103 within the respective fields of view. In an embodiment, the assessment of the portion of the textile 103 may be made by comparing the image(s) to reference images. In an embodiment, the assessment of the portion of the textile 103 may be made by comparing the image(s) to predefined thresholds. If a camera determines that no defect is present, the camera can issue a PASS signal to the pass/fail controller 115. If a camera determines that a defect is present, the camera can issue a FAIL signal to the pass/fail controller 115. The pass/fail controller 115 can provide a signal to the PLC 114 to cause the motor 107 to advance the conveyor belt 101 (no defect present) or to stop the conveyor belt 101 (defect present). The pass/fail controller 115 can further transmit a notification to the monitors 116-118 associated with the camera(s) issuing the FAIL signal to display a FAIL notification. An operator (e.g., a human or a robot) positioned at the monitors 116-118 displaying the FAIL notification can take corrective action to remedy the FAIL status. For example, if the FAIL signal was issued as a result of incorrect raised pile height, the needle bar can be adjusted to correct future defects of the same type. In another example, if the FAIL signal was issued as a result of a low pile height, the bed can be adjusted to correct future defects of the same type. In a further example, if the FAIL signal was issued as a result of the pile being too high in an area compared to standard, the yarn rates may be adjusted to correct future defects of the same type. In another example, if the FAIL signal was issued as a result of the pile being too varied in an area compared to standard, the bed may be adjusted to correct future defects of the same type.

Figure 2:
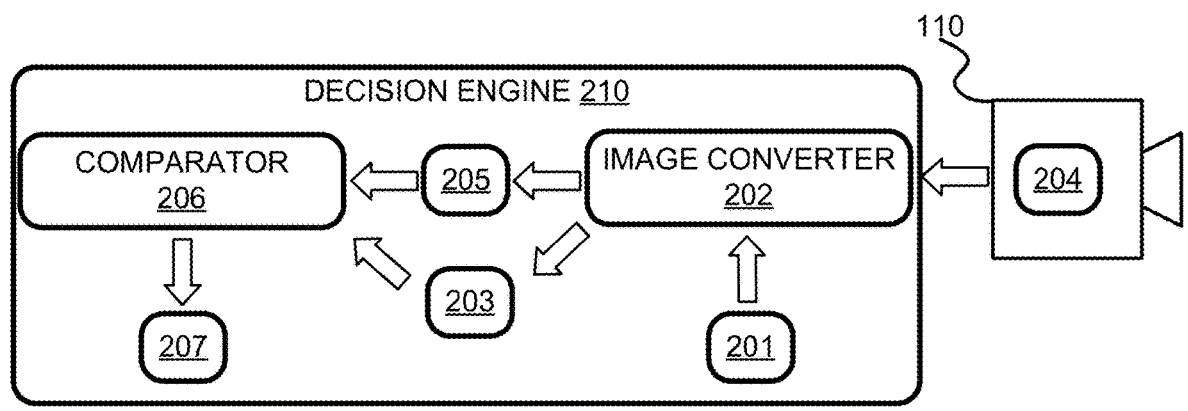
FIG. 2 is an example decision engine.
Figure 3A:
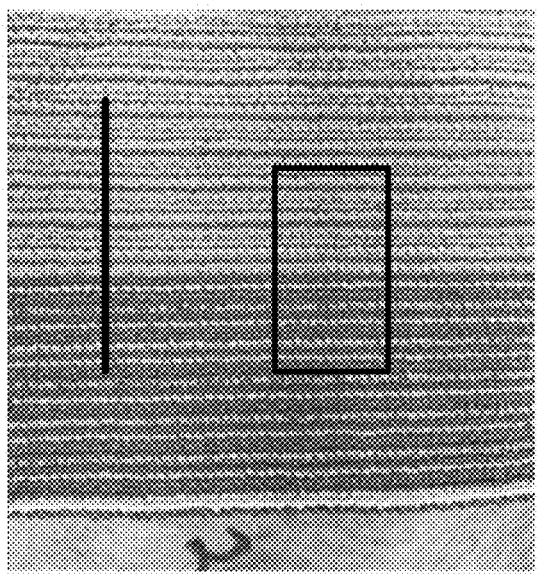
FIG. 3A is an example image of a portion of an object.

FIG. 2A illustrates the decision engine 210 with a comparator 206. A reference image 201 may be generated using a reference textile that is established as being free from defects. The reference image 201 may be obtained using a 3D camera. A plurality of reference images 201 may be generated. A reference textile may have several reference images 201 associated with the reference textile. Each reference image 201 may be associated with a specific portion of the reference textile. Each reference image 201 may be further associated with a camera whose field of view is situated to generate an image of the portion of the textile 103 under inspection that corresponds to the specific portion of the reference textile. FIG. 3A shows an example of a reference image 201. The reference image may be denoted in some manner, such as with a reference identifier and stored in for comparison with images taken during manufacturing runs. The reference image may be updated as needed due to a varying circumstances.

An image converter 202 of the decision engine 210 may receive the reference image 201 and convert the reference image 201 into a depth map. The reference image 201 may comprise a point cloud and/or a depth map. A point cloud and a depth map may be considered as two different ways to view the same information. However, with a point cloud all points are observable, whereas a depth map only reflects points from the point cloud that can be observed from a particular viewpoint. A depth map may be generated from the point cloud by assuming some viewpoint of the point cloud data in the coordinate system of the point cloud data. Any 3D point in a point cloud may be described by specifying x, y, and z components. An alternative representation of a 3D point may be described by specifying angles theta, phi, and a distance. Theta and phi in specify the angles of a ray coming out of the origin (or any other viewpoint). The distance along the ray needed to reach a point in the point cloud is the depth value. A depth image stores these depth values for different directions or rays. The rows of a depth map can correspond to one of the angles (e.g., phi), and the columns of the depth map can correspond to the other angle (e.g., theta). Each pixel may correspond to different directions or different rays, and the value stored at the pixel is the depth along that ray needed to travel before hitting a point from the point cloud.

Figure 3B:
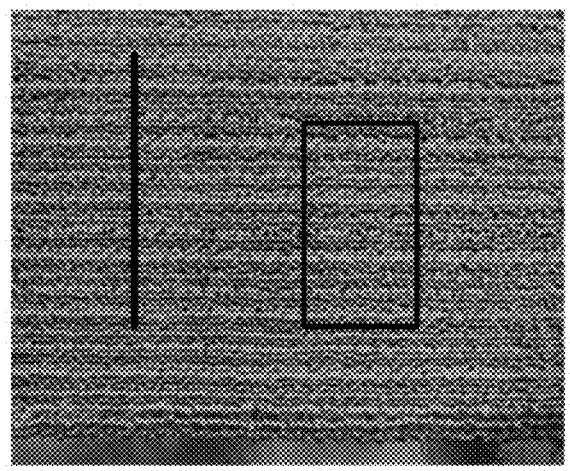
FIG. 3B is an example image of a portion of an object.

The image converter 202 may assign a color to each pixel in the depth map, wherein the color corresponds to a distance from the camera to the surface of the reference textile, to generate a reference topographic map 203. A gradient of one color to another color may be used to indicate a variety in pile heights. For example, pixels that represent a low pile height may be indicated as red and pixels that represent a high pile height may be indicated as green. A gradient of red to yellow to green pixels may be used to indicate pile heights. FIG. 3B shows an example of a reference topographic map 203 based on the reference image 201 of FIG. 3A.

Figure 3C:
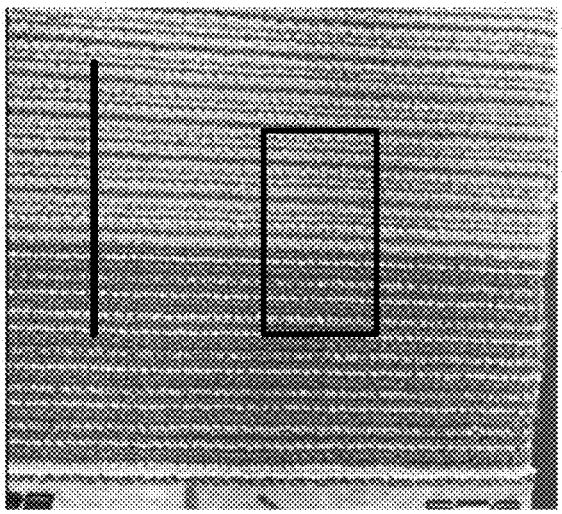
FIG. 3C is an example image of a portion of an object.
Figure 3D:
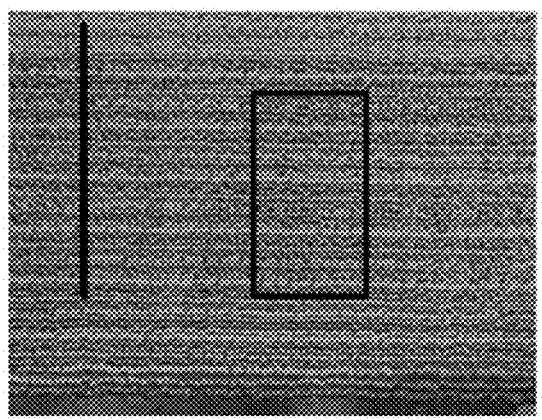
FIG. 3D is an example image of a portion of an object.

The image converter 202 of the decision engine 210 may receive an image 204 from one of the cameras (e.g., the camera 110) of the system 100. The image 204 may be taken of a textile that is currently being manufactured. The image converter 202 may convert the image 204 into a depth map. The image 204 may comprise a point cloud and/or a depth map. As described previously, the image converter 202 may generate a topographic map 205 based on the depth map of the image 204. FIG. 3B shows an example of the image 204. FIG. 3C shows an example of the topographic map 205 generated from the image 204.

The reference topographic map 203 and the topographic map 205 may be provided to the comparator 206. The comparator 206 may compare the reference topographic map 203 and the topographic map 205 to determine any variation in the topographic map 205 from the reference topographic map 203. Alternatively, the comparator 206 may be configured to compare the topographic map 205 to predetermined threshold values to determine a variation.

In an embodiment, a variation may be determined by the comparator 206 determining, for each pixel of the reference topographic map 203, a reference value indicative of a pile height. The comparator 206 may determine, for each pixel of the topographic map 205, a value indicative of a pile height. The comparator 206 may determine, for each pixel, a variation between the reference value and the value. The variation may be positive, negative, or zero. The variation may be compared to a threshold to determine whether the variation is indicative of a defect.

In an embodiment, a variation may be determined by the comparator 206 determining, for each pixel of the topographic map 205, a value indicative of a pile height. The comparator 206 may determine, for each pixel, a variation between the value and a predetermined threshold. The variation may be positive, negative, or zero. The variation may be compared to another threshold to determine whether the variation is indicative of a defect.

In an embodiment, a color measurement of each pixel the reference topographic map 203 and each pixel of the topographic map 205 may be determined. The color measurement may be a spectral value, an L*a*b* value, an RGB value, a CMYK value, an XYZ value, a density value, a Munsell display value, an infrared wavelength, an ultraviolet wavelength, or an X-ray wavelength. The comparator 206 may determine a difference in the color measurements of each pixel in the reference topographic map 203 and each corresponding pixel of the topographic map 205. The comparator 206 may register the reference topographic map 203 to the topographic map 205 to ensure that appropriate pixels in each image are being compared. One or more registration marks, shown as a vertical line and a rectangle in FIGS. 3A-3D, may be used to register or otherwise align one image to another.

Figure 4:
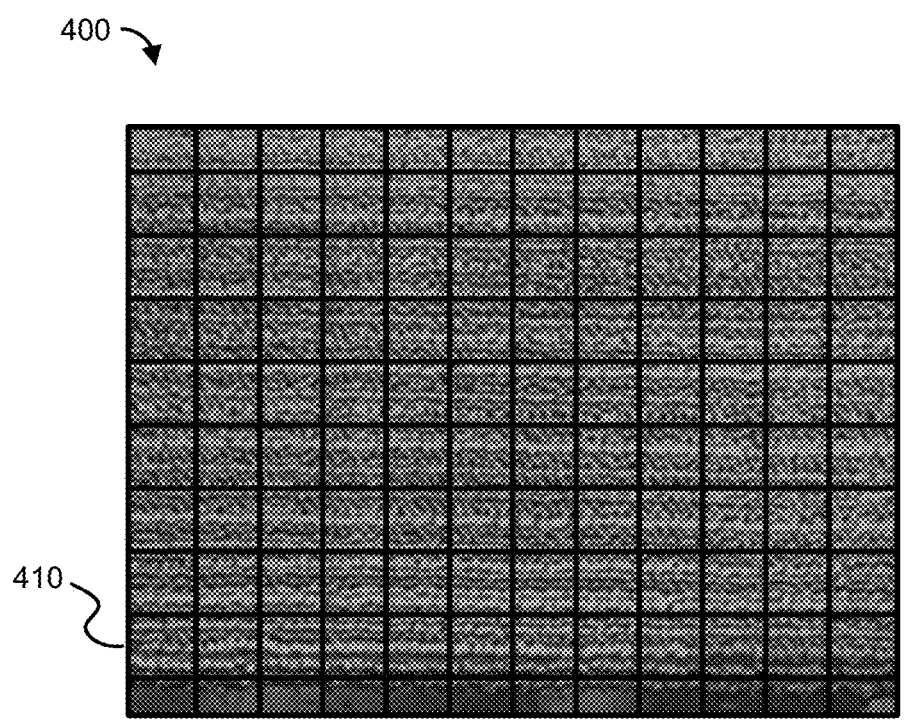
FIG. 4 is an example image of a portion of an object with a plurality of matrix frames.

In an embodiment, the reference topographic map 203 and the topographic map 205 may be subdivided into a matrix comprised of matrix frames, each matrix frame containing a pixel group. The matrix frames may then be compared. For example, a difference in color measurements within one or more matrix frames may be determined. In another example, an average color measurement may be determined for a matrix frame. The average color measurements may be compared between corresponding matrix frames in the reference topographic map 203 and the topographic map 205. The comparator 206 may determine color differences between matrix frames. FIG. 4 is a diagram illustrating a subdivided image 400. As such, the image 400 is divided into matrix frames 410. All or some of the matrix frames 410 may be used to set an evaluation range of for image area color measurement. In this way, a process of dividing the subdivided image 400 into small areas and specifying a specific area to be evaluated is simplified. The specific area to be evaluated may include one matrix frame or a plurality of matrix frames.

The size of the specific area to be evaluated may be variable. For example, certain areas of a textile may be more strictly controlled with regard to pile height, while other areas of the textile may tolerate greater variance in pile height. Matrix frames corresponding to the area of strictly controlled pile height may be analyzed, while areas with greater allowed pile height may be excluded. Similarly, matrix frames corresponding to areas of greater pile height may be compared to one set of predetermined thresholds while matrix frames corresponding to areas of lesser pile height may be compared to another set of predetermined thresholds. Each matrix frame 410 may comprise a predetermined shape, such as a rectangular shape or a circular shape, in order to determine a color difference between areas of the subdivided image 400.

Defined by the Commission Internationale de l'Eclairage (CIE), the L*a*b* color space was modeled after a color-opponent theory stating that two colors cannot be red and green at the same time or yellow and blue at the same time. As shown below, L* indicates lightness, a* is the red/green coordinate, and b* is the yellow/blue coordinate. Deltas for L* ($\Delta L^*$), a* ($\Delta a^*$) and b* ($\Delta b^*$) may be positive (+) or negative (−). The total difference, Delta E ($\Delta E^*$), however, is always positive.

The comparator 206 may be configured to average an L*a*b* value, which is color information, measured for each matrix frame 410 in the subdivided image 400. The comparator 206 may be configured to compare the matrix frame 410 color information L*a*b* values for each matrix frame 410 in the subdivided image 400 to corresponding color information L*a*b* values for each matrix frame in a subdivided reference image to calculate the color difference $\Delta E$ of each matrix frame and generate color difference data. Alternatively, the comparator 206 may be configured to compare the matrix frame 410 color information L*a*b* values for each matrix frame 410 in the subdivided image 400 to predetermined threshold values to calculate the color difference $\Delta E$ of each matrix frame and generate color difference data. Each matrix frame 410 may have a different predetermined threshold. Groups of matrix frames 410 may have share a predetermined threshold that is different from other groups of matrix frames 410.

The average L*a*b* value of the matrix frame 410 is obtained by calculating the total sum of the L*, a*, b* values of n pixels within the matrix frame and dividing the total sum by n and may be a base for calculating the matrix frame color difference.

A general pixel color difference ΔE may be obtained by image matching the reference topographic map 203 to the topographic map 205 and subtracting an evaluation L*a*b* value from a reference L*a*b* value for each pixel of the same picture portion (for example, the same specific area or the same matrix frame) and may be represented by the following Equation (1):

$$\Delta E = \sqrt{(L1-L2)^2 + (a1-a2)^2 + (b1-b2)^2}$$

A matrix frame color difference ΔE may be obtained by image matching the reference topographic map 203 to the topographic map 205, determining the total sum of the L*a*b* values of all pixels in the matrix frames in which the reference topographic map 203 to the topographic map 205 correspond to each other, averaging the total sum to calculate a reference L*a*b* value from the reference topographic map 203, and subtracting an evaluation L*a*b* value from the topographic map 205, and may represented by the following Equation (2).

$$\text{Matrix frame color difference } \Delta E = \sqrt{\{L1m1 + L1m2+, \ldots, L1mn)/n\} - \{(L2m1 + L2m2+, \ldots, L2mn)/n\}]^2 + \{(a1m1 + a1m2+, \ldots, a1n)/n\} - \{(a2m1 + a2m2+, \ldots, a2mn)/n\}^2 + \{(b1m1 + b1m2+, \ldots, b1n)/n\} - \{(b2m1 + b2m2+, \ldots, b2mn)/n\}^2}$$

The comparator 206 may be configured to average the matrix frame color difference ΔE over specific areas or the entire subdivided image 400 to calculate color difference data for the matrix frame color difference average value. Alternatively, the average value of color difference for each pixel may be determined.

In addition, the comparator 206 may be configured to determine a pixel color difference average or a matrix frame color difference average, which is a comparison value between the color difference average values of all of the pixels or the matrix frames in a specific area, based on the pixel color difference ΔE or the matrix frame color difference ΔE, and calculate color difference data for the entire subdivided image 400.

In another embodiment, a general pixel color difference average value may be determined by totaling n pixel color differences ΔE in a matrix frame including a total of n pixels and dividing the total sum by n, which is a total number of pixels, and is represented by the following Equation (3).

$$\Delta E = (\text{pixel } \Delta E1 + \text{pixel } \Delta E2+, \ldots, \text{pixel } \Delta En)/n$$

In another embodiment, a matrix frame color difference average value may be determined by totaling n matrix frame color differences ΔE in a matrix frame including a total of n matrix frames and dividing the total sum by n, which is a total number of matrix frames, and is represented by the following Equation (4).

$$\Delta E = (\text{matrix frame } \Delta E1 + \text{matrix frame } \Delta E2+, \ldots, \text{matrix frame } \Delta En)/n$$

Figure 5:
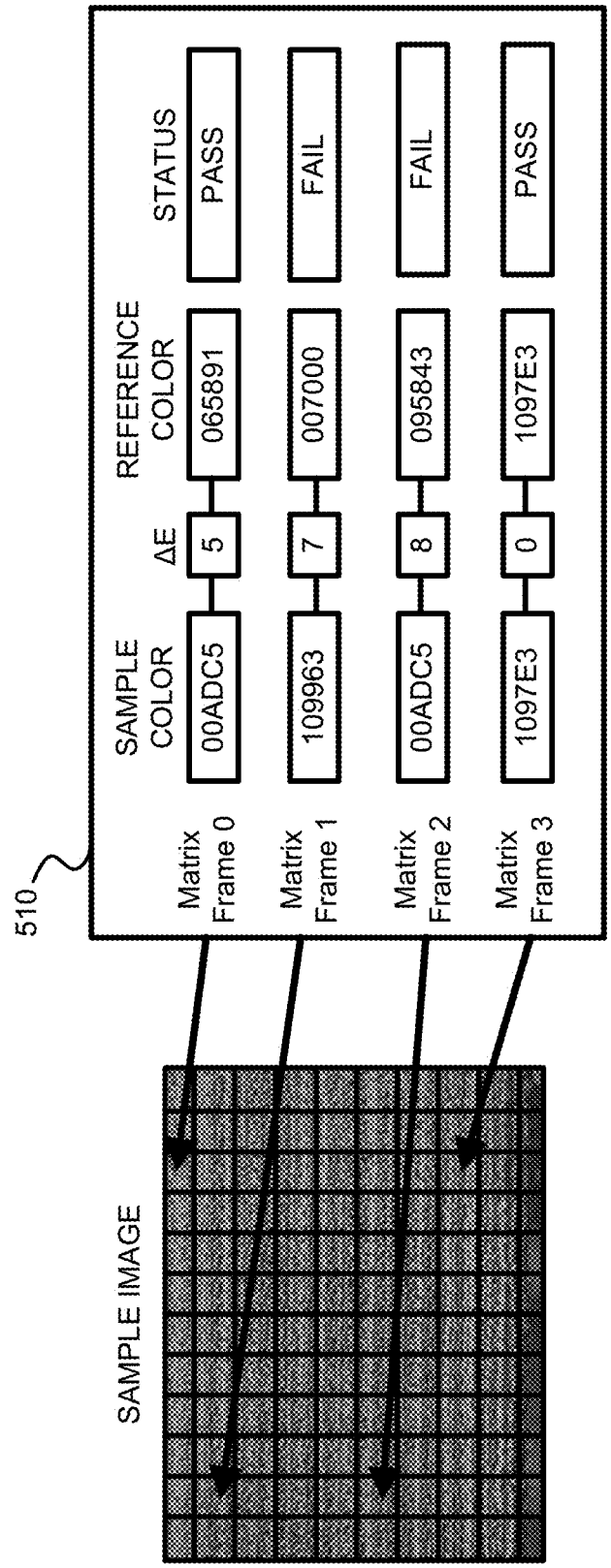
FIG. 5 is an example interface.
Figure 6:
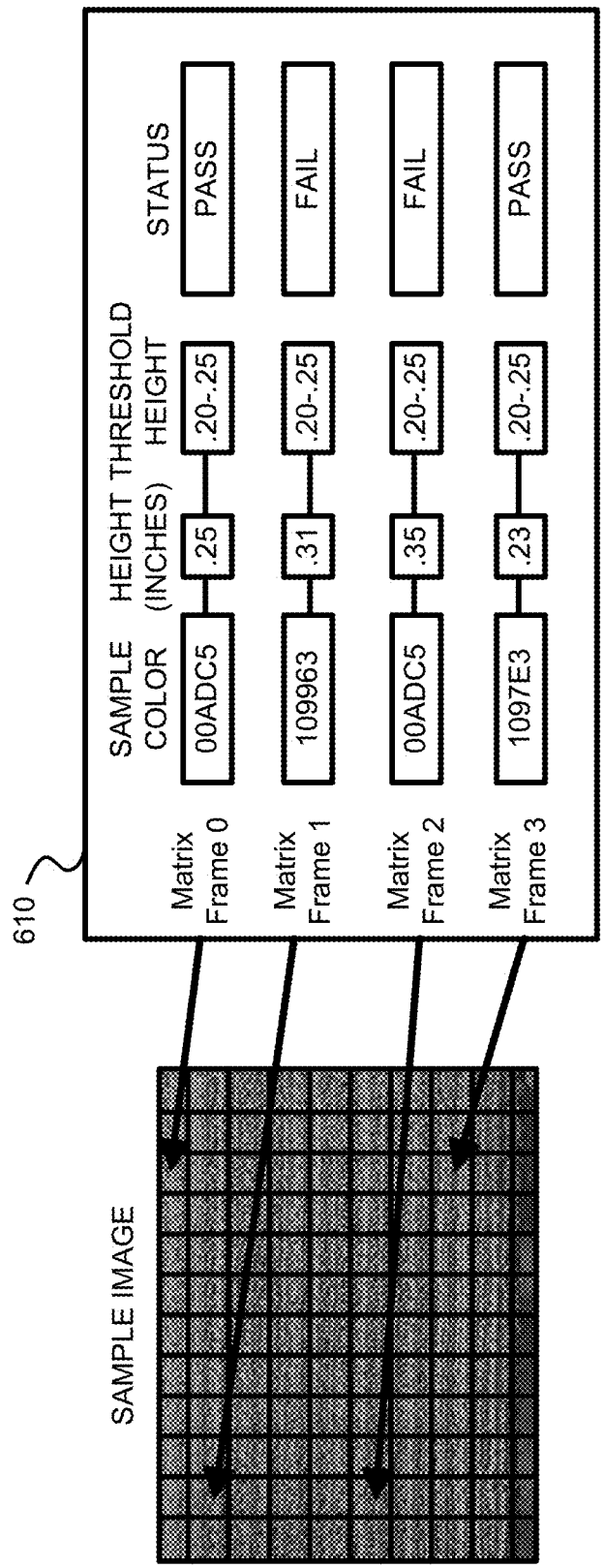
FIG. 6 is an example interface.

The color difference data for a specific area or the subdivided image 400 may be displayed by at least one of colors, characters, and numerical values, as illustrated in FIG. 5 and FIG. 6.

In FIG. 5, for example, an image display field 510 may comprise an indication of a color measurement for one or more matrix fields of the topographic map 205 (sample color) and the color measurement for the same one or more matrix fields of the reference topographic map 203 (reference color). The ΔE between the sample color and the reference color may be determined and displayed. The ΔE may be compared to a threshold value and/or each matrix frame may be compared to a threshold value specific to the matrix field. A result of the comparison may be whether the color difference, if any, is indicative of a variation in pile height such that the newly manufactured sample comprises a defect. A status of the portion of the textile associated with a matrix frame may be given a status of FAIL or PASS, based on whether the ΔE exceeded the threshold.

In FIG. 6, for example, an image display field 610 may comprise an indication of a color measurement for one or more matrix fields of the topographic map 205 (sample color). A color measurement may be correlated to a pile height in advance. A color measurement may be correlated to a range of pile heights in advance. A range of color measurements may be correlated to a pile height in advance. A range of color measurements may be correlated to a range of pile heights in advance. The correlation of pile heights to color measurements may be stored, for example, in a table, matrix, array, and the like. The comparator 206 may determine, for each pixel of the topographic map 205, the color measurement and display in the image display field 610 (sample color). The color measurements may be compared to the correlation of pile heights to color measurements to determine a pile height associated with the color measurement for each matrix field. The determined pile height may be displayed. The determined pile height may be compared to a threshold. The threshold may comprise a maximum pile height. The threshold may comprise a minimum pile height. The threshold may comprise a maximum pile height and a minimum pile height. Different matrix fields may have different thresholds. The threshold values may be displayed. The comparator 206 may determine, for each matrix field (or for each pixel) whether the determined height satisfies (e.g., is within, does not exceed, and the like) the threshold(s). A result of the comparison may be whether the determined pile height, is indicative of a variation in pile height such that the newly manufactured sample comprises a defect. A status of the portion of the textile associated with a matrix frame may be given a status of FAIL or PASS, based on whether the determined pile height exceeded the threshold(s).

As shown in FIG. 5 and FIG. 6, it is possible to easily check the color difference and to easily and rapidly determine whether a currently manufactured textile has a defect.

Figure 7:
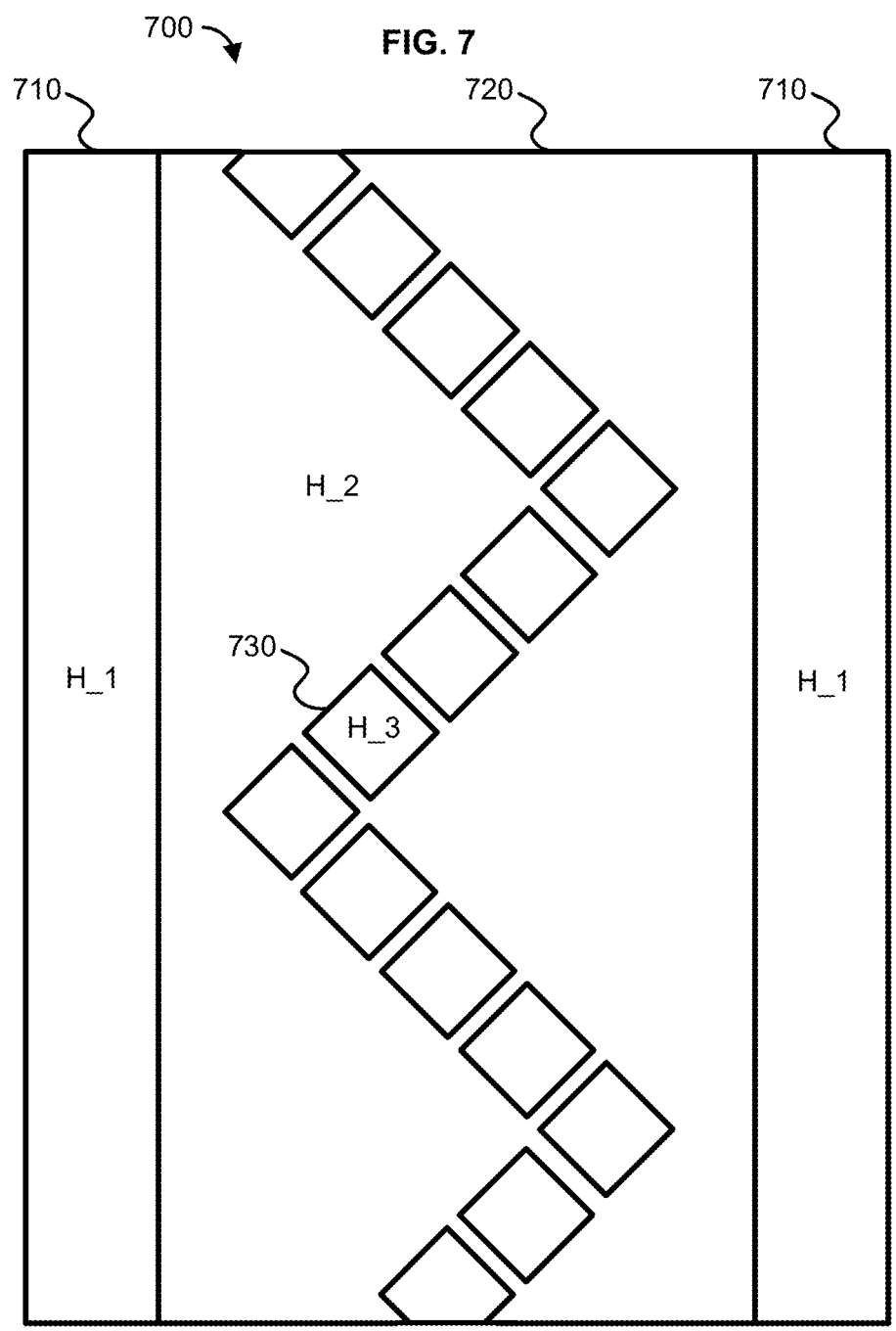
FIG. 7 is an example image of a portion of an object.

FIG. 7 shows an example image 700 of a textile having multiple pile heights as part of the design. Border sections 710 may comprise a first pile height (H_1). A center section 720 may comprise a second pile height (H_2). A pattern 730 may comprise a third pile height (H_3). In an embodiment, each of the pile heights (H_1, H_2, and H_3) may be different. In an embodiment, each of the each of the pile heights (H_1, H_2, and H_3) may comprise a different threshold for what is an acceptable pile height, what is an acceptable deviation from the acceptable pile height, and what is an unacceptable pile height. In an embodiment, one or more of the pile heights (H_1, H_2, and H_3) may be the same, for example, the pile height H_1 may be the same as the pile height H_3).

Figure 8:
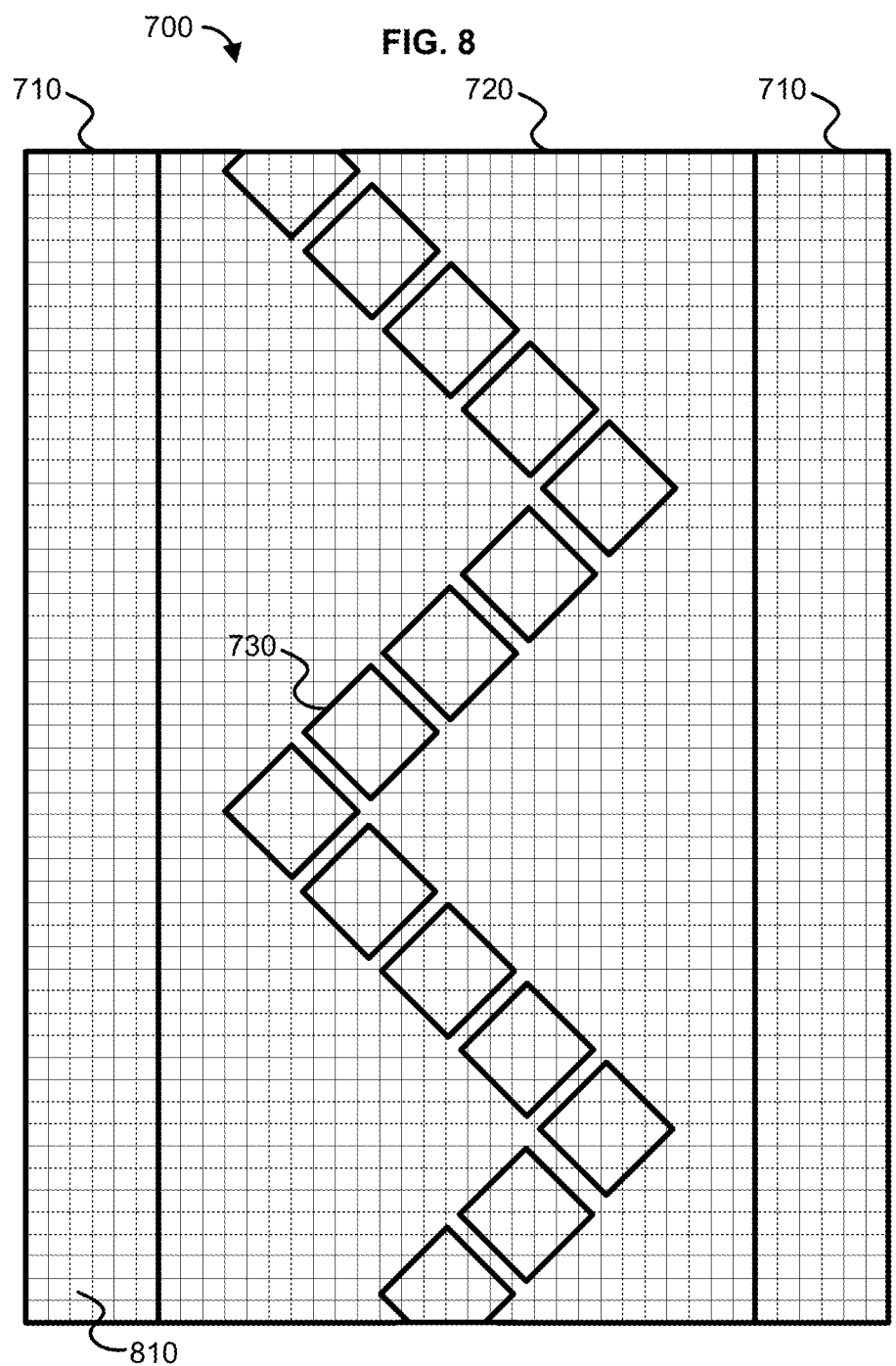
FIG. 8 is an example image of a portion of an object with a plurality of matrix frames.

FIG. 8 shows a plurality of matrix frames 810 overlaid on the image 700. The plurality of matrix frames 810 may vary in size, based on the size of the various sections of the image 700 of the textile (e.g., the border section 710, the center section 720, and the design 730). In an embodiment, one or more of the plurality of matrix frames 810 may be analyzed independently for each section of the image 700 of the textile. The comparator 206 may analyze the image 700 as described above to determine any variances in pile height.

The comparator 206 may generate an output 207 indicating the determined variation(s). Based on the output 207, the pass/fail controller 115 may provide a notification to the monitors 116, 117, and/or 118 and/or cause the PLC 114 to advance or stop the motor 107.

As described, the decision engine 210 may be configured to compare a topographic map of a newly acquired image of a portion of a textile to a reference topographic map of a reference image of the same corresponding portion of a reference textile.

In another embodiment, the decision engine 210 may be configured to compare a topographic map of a newly acquired image of a portion of a textile to another topographic map of another newly acquired image of another portion of the same textile. For example, a textile intended to have a common pile height throughout may have images generated from two different portions of the textile. Topographic maps may be generated for each portion and the topographic maps compared. Any variances between the two topographic maps may be indicative of a defect.

In another embodiment, the decision engine 210 may be configured to compare a topographic map of a newly acquired image of a portion of a textile manufactured by a first machine to another topographic map of another newly acquired image of a corresponding portion of a different textile manufactured by a second machine. For example, two textiles intended to have similar pile heights may have images generated from corresponding portions of the respective textiles. Topographic maps may be generated and the topographic maps compared. Any variances between the two topographic maps may be indicative of a defect affecting the first machine or the second machine.

In another embodiment, the decision engine 210 may be configured to compare a topographic map of a newly acquired image of a portion of a textile manufactured by a machine to another topographic map of another newly acquired image of a corresponding portion of a different textile manufactured by the same machine later in time. For example, two textiles intended to have similar pile heights may have images generated from corresponding portions of the respective textiles. Topographic maps may be generated and the topographic maps compared. Any variances between the two topographic maps may be indicative of a defect affecting the machine.

FIG. 9A is an image of a textile, such as a piece of carpet. The textile may contain an off gauge tuft and a hole in the carpet where a tuft was pulled out onto the back of the carpet. From this image alone, it is difficult, if not impossible, to identify these defects. FIG. 9B shows the topographic map of the textile of FIG. 9A. It is readily apparent based on the coloration that there is an off gauge tuft 910 in the textile. Moreover, based on the coloration, the hole 920 is readily apparent.

FIG. 10 shows a method 1000 comprising obtaining (e.g., receiving) an image of at least a portion of a textile at 1010. Obtaining the image of the at least the portion of the textile may comprise receiving the image from a three-dimensional camera.

The method 1000 may comprise comparing the image to a reference image of a reference textile at 1020. The method 1000 may further comprise obtaining the reference image of the reference textile. Comparing the image to the reference image of the reference textile may comprise determining, for each pixel of the reference image, a reference value indicative of a pile height, determining, for each pixel of the image, a value indicative of a pile height, and determining, for each pixel, a variation between the reference value and the value.

The method 1000 may comprise determining, based on the comparison, one or more areas indicative of a height variation between the textile and the reference textile at 1030. Determining, based on the comparison, one or more areas indicative of a height variation between the textile and the reference textile may comprise identifying each pixel having a variation that satisfies a threshold. The height variation may be one of a negative value, a positive value, or a zero value.

The method 1000 may comprise performing an action based on the one or more areas indicative of the height variation at 1040. Performing an action based on the one or more areas indicative of the height variation may comprise generating a pass inspection signal. Performing an action based on the one or more areas indicative of the height variation may comprise generating a fail inspection signal and notifying an operator that the textile should be removed from a belt having the textile disposed thereon.

Performing an action based on the one or more areas indicative of the height variation may comprise: one or more of, raising or lowering a belt having the textile disposed thereon, adjusting a carriage, adjusting a cam, adjusting a bed, and/or adjusting a guide.

The method 1000 may further comprise generating an overlay for the image, wherein the overlay comprises, at each pixel, a color indicative of the variation.

Figure 11:
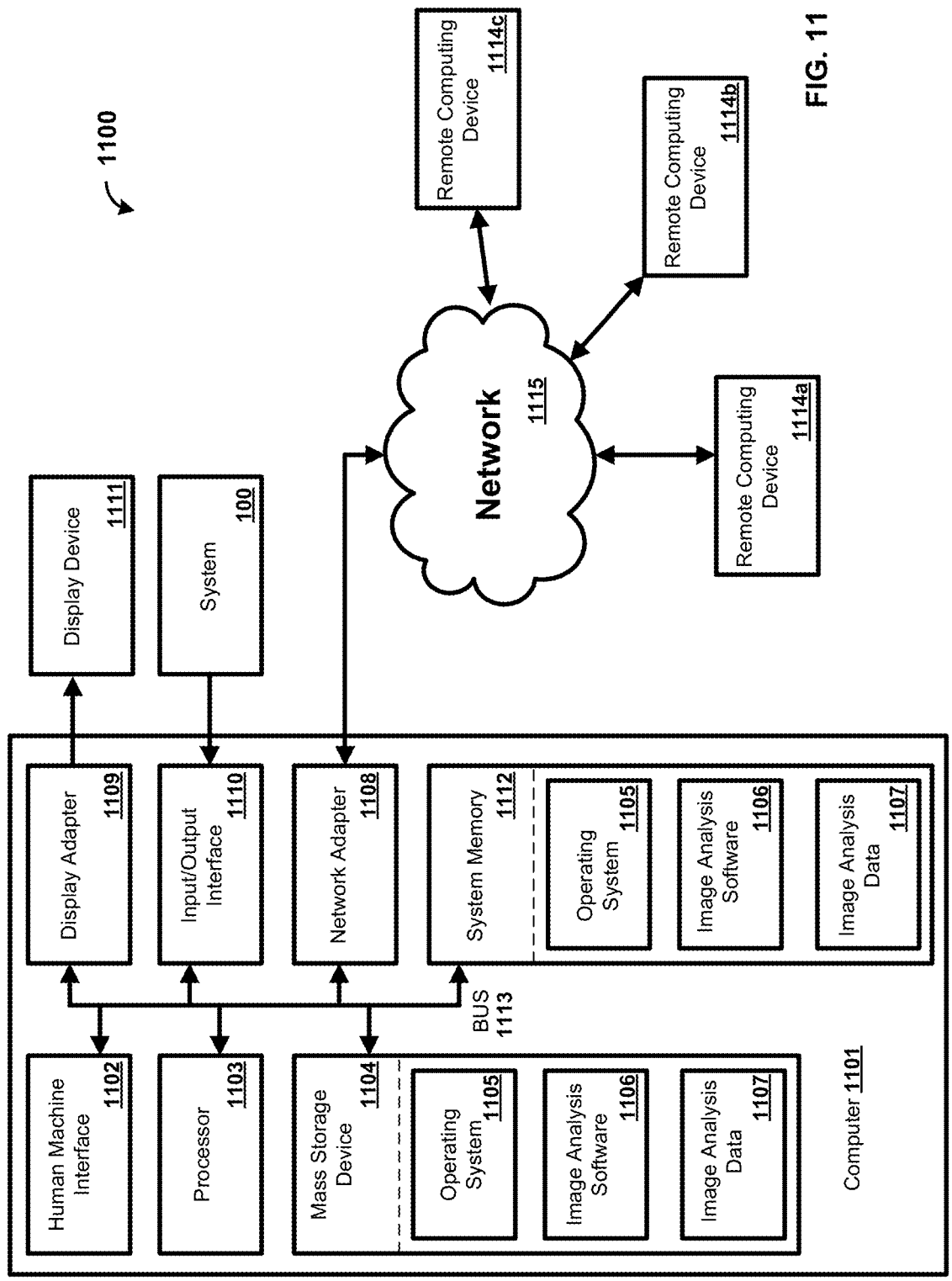
FIG. 11 is an exemplary operating environment.

In an exemplary aspect, the methods and systems can be implemented on a computer 1101 as illustrated in FIG. 11 and described below. By way of example, the camera 108, the camera 109, the camera 110, the PLC 114, and/or the pass/fail controller 115 (or a component thereof) of FIG. 1 can be a computer 1101 as illustrated in FIG. 11. Similarly, the methods and systems disclosed can utilize one or more computers to perform one or more functions in one or more locations. FIG. 11 is a block diagram illustrating an exemplary operating environment 1100 for performing the disclosed methods. This exemplary operating environment 1100 is only an example of an operating environment and is not intended to suggest any limitation as to the scope of use or functionality of operating environment architecture. Neither should the operating environment 1100 be interpreted as having any dependency or requirement relating to any one or combination of components illustrated in the exemplary operating environment 1100.

The present methods and systems can be operational with numerous other general purpose or special purpose computing system environments or configurations. Examples of well-known computing systems, environments, and/or configurations that can be suitable for use with the systems and methods comprise, but are not limited to, personal computers, server computers, laptop devices, and multiprocessor systems. Additional examples comprise set top boxes, programmable consumer electronics, network PCs, programmable logic controllers (PLCs), minicomputers, mainframe computers, distributed computing environments that comprise any of the above systems or devices, and the like.

The processing of the disclosed methods and systems can be performed by software components. The disclosed systems and methods can be described in the general context of computer-executable instructions, such as program modules, being executed by one or more computers or other devices. Generally, program modules comprise computer code, routines, programs, objects, components, data structures, and/or the like that perform particular tasks or implement particular abstract data types. The disclosed methods can also be practiced in grid-based and distributed computing environments where tasks are performed by remote processing devices that are linked through a communications network. In a distributed computing environment, program modules can be located in local and/or remote computer storage media including memory storage devices.

Further, one skilled in the art will appreciate that the systems and methods disclosed herein can be implemented via a general-purpose computing device in the form of a computer 1101. The computer 1101 can comprise one or more components, such as one or more processors 1103, a system memory 1112, and a bus 1113 that couples various components of the computer 1101 including the one or more processors 1103 to the system memory 1112. In the case of multiple processors 1103, the system can utilize parallel computing.

The bus 1113 can comprise one or more of several possible types of bus structures, such as a memory bus, memory controller, a peripheral bus, an accelerated graphics port, and a processor or local bus using any of a variety of bus architectures. The bus 1113, and all buses specified in this description can also be implemented over a wired or wireless network connection.

The computer 1101 typically comprises a variety of computer readable media. Exemplary readable media can be any available media that is accessible by the computer 1101 and comprises, for example and not meant to be limiting, both volatile and non-volatile media, removable and non-removable media. The system memory 1112 can comprise computer readable media in the form of volatile memory, such as random access memory (RAM), and/or non-volatile memory, such as read only memory (ROM). The system memory 1112 typically can comprise data such as image analysis data 1107 and/or program modules such as operating system 1105 and image analysis software 1106 that are accessible to and/or are operated on by the one or more processors 1103.

In another aspect, the computer 1101 can also comprise other removable/non-removable, volatile/non-volatile computer storage media. The mass storage device 1104 can provide non-volatile storage of computer code, computer readable instructions, data structures, program modules, and other data for the computer 1101. For example, a mass storage device 1104 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 1104, including by way of example, an operating system 1105 and image analysis software 1106. One or more of the operating system 1105 and image analysis software 1106 (or some combination thereof) can comprise elements of the programming and the image analysis software 1106. Image analysis data 1107 can also be stored on the mass storage device 1104. Image analysis data 1107 can be stored in any of one or more databases known in the art. Examples of such databases comprise, DB2®, Microsoft® Access, Microsoft® SQL Server, Oracle®, mySQL, PostgreSQL, and the like. The databases can be centralized or distributed across multiple locations within the network 1115.

In another aspect, the user can enter commands and information into the computer 1101 via an input device (not shown). Examples of such input devices comprise, but are not limited to, a keyboard, pointing device (e.g., a computer mouse, remote control), a microphone, a joystick, a scanner, touch-enabled devices such as a touchscreen, tactile input devices such as gloves and other body coverings, motion sensors, and the like. These and other input devices can be connected to the one or more processors 1103 via a human machine interface 1102 that is coupled to the bus 1113, but can be connected by other interface and bus structures, such as, but not limited to, a parallel port, game port, an IEEE 1394 Port (also known as a Firewire port), a serial port, network adapter 1108, and/or a universal serial bus (USB).

In yet another aspect, a display device 1111 can also be connected to the bus 1113 via an interface, such as a display adapter 1109. It is contemplated that the computer 1101 can have more than one display adapter 1109 and the computer 1101 can have more than one display device 1111. For example, a display device 1111 can be a monitor, an LCD (Liquid Crystal Display), light emitting diode (LED) display, television, smart lens, smart glass, and/or a projector. In addition to the display device 1111, other output peripheral devices can comprise components such as speakers (not shown) and a printer (not shown) which can be connected to the computer 1101 via Input/Output Interface 1110. Any step and/or result of the methods can be output in any form to an output device. Such output can be any form of visual representation, including, but not limited to, textual, graphical, animation, audio, tactile, and the like. The display 1111 and computer 1101 can be part of one device, or separate devices.

In an aspect, the computer 1101 can be coupled to the system 100 via the Input/Output Interface 1110. The computer 1101 can be configured to monitor and store data. The computer 1101 can be configured to store images acquired by cameras connected to the system 100, store data related to pass/fail statistics generated during system-generated inspections, etc. The computer 1101 can also be used as a programming interface to one or more smart devices (e.g., smart cameras) and/or embedded logic controllers that require customized firmware to operate. The computer 1101 can be used to generate, troubleshoot, upload, and store iterations of this software or firmware.

The computer 1101 can operate in a networked environment using logical connections to one or more remote computing devices 1114a,b,c. By way of example, a remote computing device 1114a,b,c can be a personal computer, computing station (e.g., workstation), portable computer (e.g., laptop, mobile phone, tablet device), smart device (e.g., smartphone, smart watch, activity tracker, smart apparel, smart accessory), security and/or monitoring device, a server, a router, a network computer, a peer device, edge device or other common network node, and so on. Logical connections between the computer 1101 and a remote computing device 1114a,b,c can be made via a network 1115, such as a local area network (LAN) and/or a general wide area network (WAN). Such network connections can be through a network adapter 1108. A network adapter 1108 can be implemented in both wired and wireless environments. Such networking environments are conventional and commonplace in dwellings, offices, enterprise-wide computer networks, intranets, and the Internet. In an aspect, the network adapter 1108 can be configured to provide power to one or more connected devices (e.g., a camera). For example, the network adapter 1108 can adhere to the Power-over-Ethernet (PoE) standard or the like.

For purposes of illustration, application programs and other executable program components such as the operating system 1105 are illustrated herein as discrete blocks, although it is recognized that such programs and components can reside at various times in different storage components of the computing device 1101, and are executed by the one or more processors 1103 of the computer 1101. An implementation of image analysis software 1106 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer readable media can comprise "computer storage media" and "communications media." "Computer storage media" can comprise volatile and non-volatile, removable and non-removable media implemented in any methods or technology for storage of information such as computer readable instructions, data structures, program modules, or other data. Exemplary computer storage media can comprise RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed is:

1. A method comprising:
   determining, by a computing device, based on a comparison of an image of at least a portion of a textile to a reference image of a reference textile, one or more areas indicative of a height variation between the textile and the reference textile; and
   performing an action based on the one or more areas indicative of the height variation.

2. The method of claim 1, further comprising:
   determining, for each pixel of the reference image, a reference value indicative of a pile height;
   determining, for each pixel of the image, a value indicative of the pile height; and
   determining, for each pixel of the image, the height variation between the reference value and the value.

3. The method of claim 2, wherein determining the one or more areas indicative of the height variation between the textile and the reference textile comprises:
   determining, for each pixel of the image, whether the height variation between the reference value and the value satisfies a threshold indicative of a defect in the portion of the textile.

4. The method of claim 2, further comprising: generating an overlay for the image.

5. The method of claim 4, wherein the overlay comprises, at each pixel of the image, a color indicative of the height variation between the reference value and the value.

6. The method of claim 1, wherein the height variation between the textile and the reference textile comprises a height variation between at least one pile height associated with the textile and at least one pile height associated with the reference textile.

7. The method of claim 1, wherein performing the action based on the one or more areas indicative of the height variation comprises at least one of:
   sending, to a second computing device, an indication of the one or more areas indicative of the height variation, wherein the second computing device causes the action to be performed;
   generating a pass inspection signal;
   generating a fail inspection signal;
   notifying an operator that the textile should be removed from a belt having the textile disposed thereon;
   raising the belt having the textile disposed thereon;
   lowering the belt having the textile disposed thereon;
   adjusting a carriage;
   adjusting a cam;
   adjusting a bed; or
   adjusting a guide.

8. A method comprising:
   determining, by a first computing device, based on a comparison of an image of at least a portion of a textile to a reference image of a reference textile, one or more areas indicative of a height variation between the textile and the reference textile; and
   sending, to a second computing device, an indication of the one or more areas indicative of the height variation.

9. The method of claim 8, further comprising:
   receiving, by the second computing device, the indication of the one or more areas indicative of the height variation; and
   causing, by the second computing device, an action to be performed based on the one or more areas indicative of the height variation.

10. The method of claim 8, further comprising:
    determining, for each pixel of the reference image, a reference value indicative of a pile height;
    determining, for each pixel of the image, a value indicative of the pile height; and
    determining, for each pixel of the image, the height variation between the reference value and the value.

11. The method of claim 10, wherein determining the one or more areas indicative of the height variation between the textile and the reference textile comprises:
    determining, for each pixel of the image, whether the height variation between the reference value and the value satisfies a threshold indicative of a defect in the portion of the textile.

12. The method of claim 10, further comprising: generating an overlay for the image.

13. The method of claim 12, wherein the overlay comprises, at each pixel of the image, a color indicative of the height variation between the reference value and the value.

14. The method of claim 9, wherein causing the action based on the one or more areas indicative of the height variation comprises at least one of:
- generating a pass inspection signal;
- generating a fail inspection signal;
- notifying an operator that the textile should be removed from a belt having the textile disposed thereon;
- raising the belt having the textile disposed thereon;
- lowering the belt having the textile disposed thereon;
- adjusting a carriage;
- adjusting a cam;
- adjusting a bed; or
- or adjusting a guide.

15. An apparatus comprising:
- one or more processors; and
- memory storing processor-executable instructions that, when executed by the one or more processors, cause the apparatus to:
    - determine, based on a comparison of an image of at least a portion of a textile to a reference image of a reference textile, one or more areas indicative of a height variation between the textile and the reference textile; and
    - cause an action to be performed based on the one or more areas indicative of the height variation.

16. The apparatus of claim 15, wherein the processor-executable instructions further cause the apparatus to:
- determine, for each pixel of the reference image, a reference value indicative of a pile height;
- determine, for each pixel of the image, a value indicative of the pile height; and
- determine, for each pixel of the image, the height variation between the reference value and the value.

17. The apparatus of claim 16, wherein the processor-executable instructions that cause the apparatus to determine the one or more areas indicative of the height variation between the textile and the reference textile further cause the apparatus to:
- determine, for each pixel of the image, whether the height variation between the reference value and the value satisfies a threshold indicative of a defect in the portion of the textile.

18. The apparatus of claim 16, wherein the processor-executable instructions further cause the apparatus to: generate an overlay for the image.

19. The apparatus of claim 18, wherein the overlay comprises, at each pixel of the image, a color indicative of the height variation between the reference value and the value.

20. The apparatus of claim 15, wherein the height variation between the textile and the reference textile comprises a height variation between at least one pile height associated with the textile and at least one pile height associated with the reference textile.

* * * * *